United States Patent [19]

Smith et al.

[11] 4,057,454
[45] Nov. 8, 1977

[54] MANDREL FOR FABRICATING AN AIR SPRING

[75] Inventors: Michael W. Smith, Mogadore; Stanley J. Houck, Akron, both of Ohio

[73] Assignee: The Goodyear Tire & Rubber Company, Akron, Ohio

[21] Appl. No.: 717,734

[22] Filed: Aug. 24, 1976

[51] Int. Cl.$^2$ .................. B23B 31/40; B29H 17/22
[52] U.S. Cl. ........................... 156/401; 242/72 B; 279/2 A
[58] Field of Search ............. 279/2 A, 2 R; 242/68, 242/68.2, 68.4, 72 B, 73; 269/48.1; 156/400, 401, 414, 415

[56] References Cited

U.S. PATENT DOCUMENTS

| 2,882,061 | 4/1959 | Johnson | 279/2 R |
| 2,971,562 | 2/1961 | Hollis | 156/400 X |
| 3,018,518 | 1/1962 | Jefferys | 156/401 X |
| 3,173,821 | 3/1965 | Trevaskis | 156/401 |

FOREIGN PATENT DOCUMENTS

| 413,097 | 6/1974 | U.S.S.R. | 156/414 |

*Primary Examiner*—Willie G. Abercrombie
*Assistant Examiner*—Z. R. Bilinsky
*Attorney, Agent, or Firm*—F. W. Brunner; R. S. Washburn

[57] ABSTRACT

Two embodiments of a mandrel for fabricating an air spring are disclosed. Each has a fixed diameter cylindrical portion and a portion variable in diameter to provide an extension of the cylindrical surface expandable to conic form. An array of fingers are pivotally secured to swing in radial planes to provide the variable diameter portions and are actuated by inflatable sleeves. The fingers are notched to provide a locating groove for the wire ring at the end of the air spring. Ply endings are folded about the wire ring by a second inflatable sleeve or bladder.

8 Claims, 3 Drawing Figures

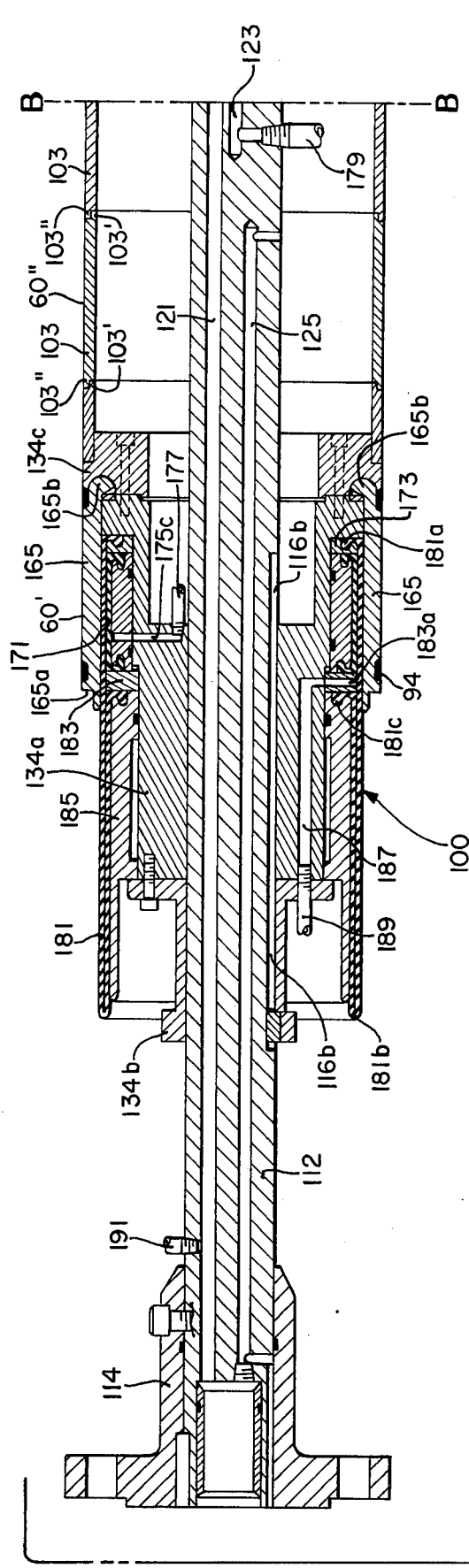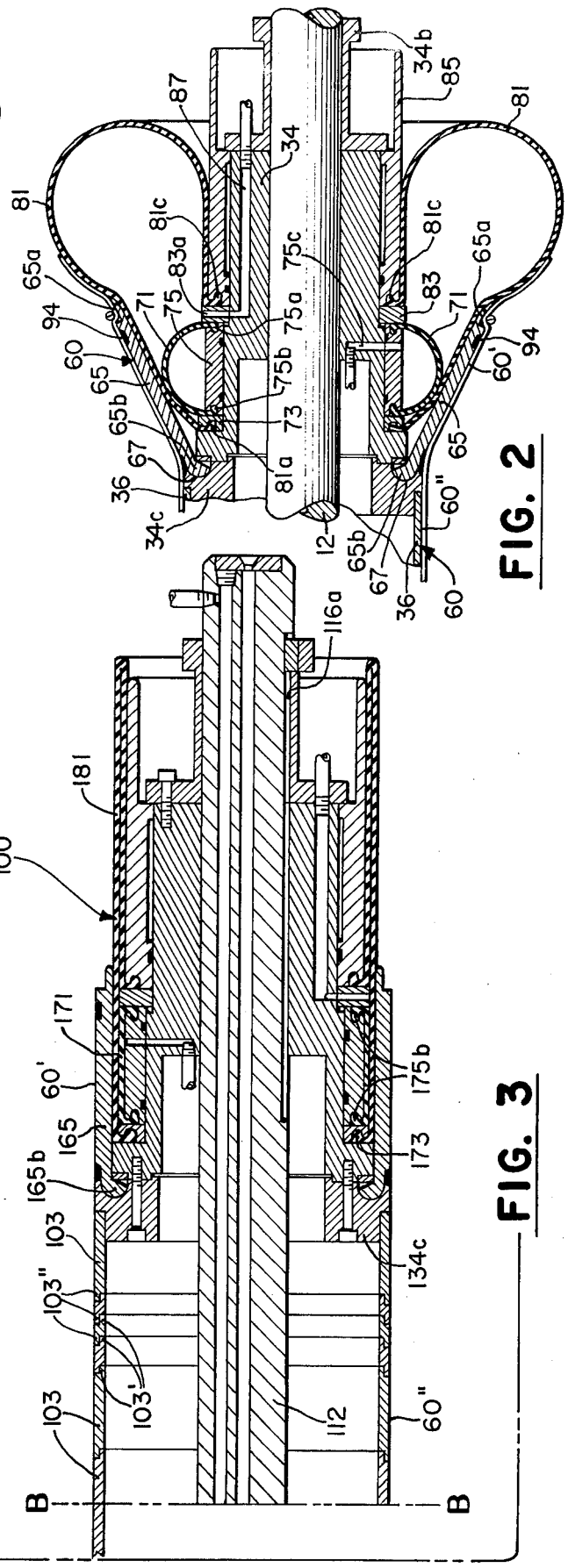
FIG. 2
FIG. 3

MANDREL FOR FABRICATING AN AIR SPRING

The present invention relates to a mandrel for fabricating an air spring.

Broadly, the invention provides an apparatus for fabricating an air spring prior to its being shaped and cured, the air spring having an inextensible ring enfolded coaxially thereof in each of its axial ends, the apparatus comprising means defining a straight cylindrical surface axially coextensive with said air spring between said axial ends, said means including a fixed diameter portion and a variable diameter portion, the variable diameter portion comprising a multiplicity of axially extending fingers each having one end fixed radially adjacent one end of the fixed diameter portion and another end movable radially outward relative to its fixed end, each said other end having a notch, the plurality of notches cooperating to form a circumferential groove coaxially about said cylindrical surface and radially outwardly thereof, and expansion means for moving the outer ends of the fingers radially outward.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

In the drawings:

FIG. 2 is a partial longitudinal view, in cross section, illustrating a feature of the mandrel according to the invention; and FIG. 3 is a longitudinal view, in cross section, of a further embodiment of the invention.

Figure 1:
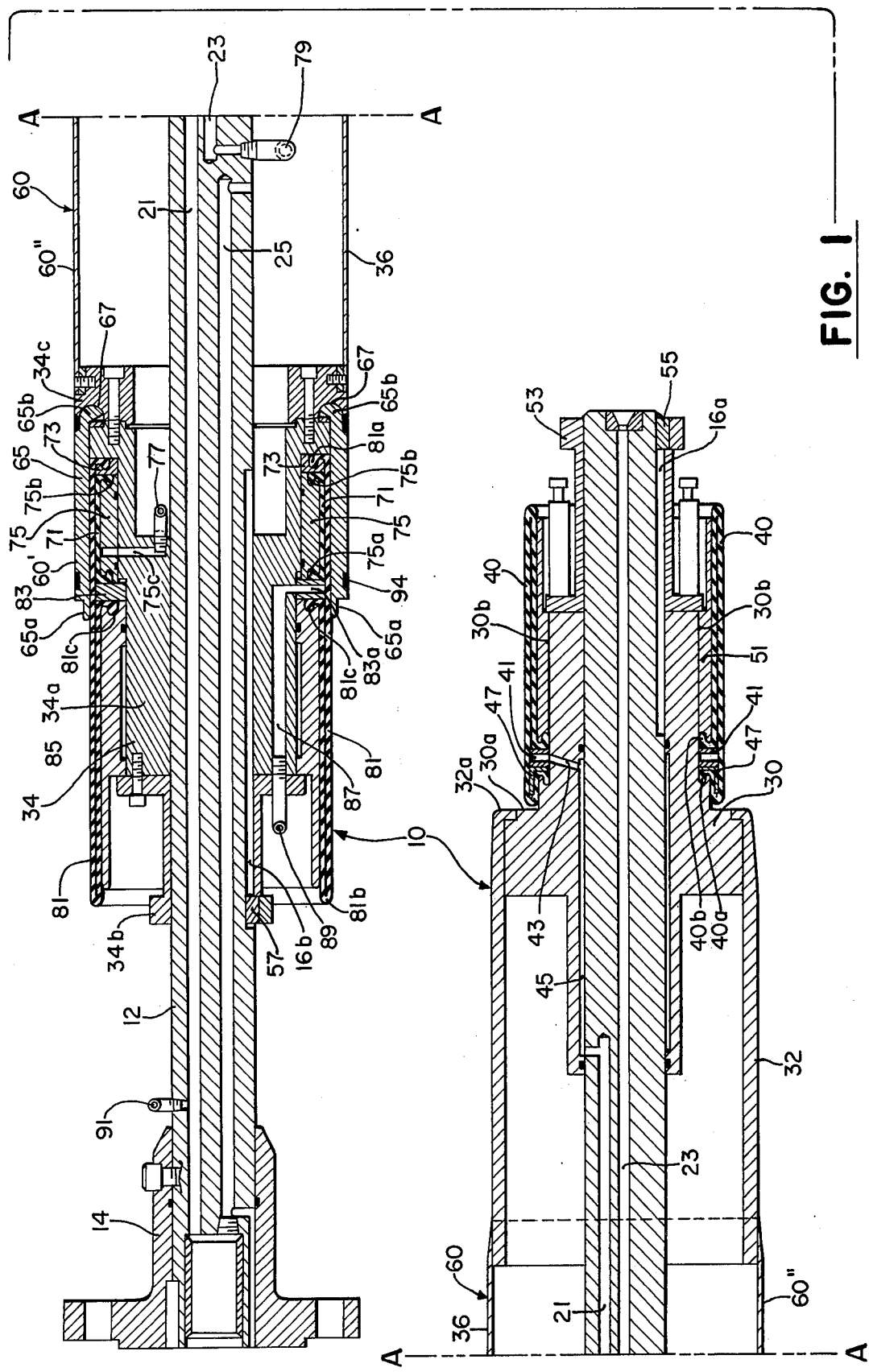
FIG. 1 is a longitudinal view, in cross section, of a mandrel embodying the invention.

The mandrel 10, FIG. 1, has a shaft 12 fitted with a flanged collet 14 for mounting on a rotatable spindle and provided with a pair of longitudinal keyways 16a, 16b and with longitudinal internal passages 21,23,25.

An annular body 30 is mounted on the shaft corotatably and, to adjust the working length of the mandrel, is slidable along the shaft. A cylindrical wall 32 is fixed coaxially on the annular body and extends axially toward a second annular body 34 and telescopically into a second cylindrical wall 36 fixed on the second annular body and which extends axially to overlie the first cylindrical wall 32. The axially outer end 32a of the first cylindrical wall and a coplanar face 30a formed on the annular body 30 at a plane normal to the shaft 12 provide a shoulder which determines the position of an inextensible ring about which ply endings are turned to form one end of the air spring.

It will be noted on inspection of FIG. 1 that the cylindrical wall 32 is tapered inwardly toward the shoulder at about 5° which taper is found to facilitate the formation of the end of the sleeve.

To fold the endings of a ply around an inextensible ring a bladder 40 is mounted on an extension 30b of the annular body such that the cylindrical outer surface of the bladder is disposed at a diameter less than the diameter of the cylindrical wall 32. Compressed air to inflate the bladder is admitted by way of an air inlet spacer 41, a passage 43 in the body communicating with an annular chamber 45 which in turn is in communication with the passage 21 in the shaft. A retainer 47 immediately adjacent the air inlet spacer 41 has an L-shaped section one leg of which overlies the inner wall of the bladder adjacent its bight at the shoulder, face 30a. The retainer serves to control the extent of local expansion of the bladder 40. The edges 40a,40b of the bladder are secured respectively in an annular groove formed in the body and in an annular groove provided by a clamp sleeve 51. The sleeve 51 is pressed axially toward the edges 40a,40b securing them, as well as the spacer 41 and retainer 47, therebetween. The clamp sleeve is fixed to the body 30 by the shaft collar 53 which also carries a key 55 slidable in the keyway 16a of the shaft. The axial position of the annular body 30 along the shaft is adjustably fixed by a suitable clamp screw or the like (not shown).

The second annular body 34, previously referred to, includes a first body member 34a, a shaft collar 34b, and a cavity ring 34c secured to the first member by cap screws. This body 34 is slidable axially of the shaft 12 and corotatable therewith, there being a key 57 disposed in the shaft collar 34b slidable in the keyway 16b. Its location axially of the shaft 12 is fixed by a clamp screw or other suitable means (not shown).

In the mandrel 10, a cylindrical surface 60 is provided by the two cylindrical walls 32,36 and by the multiplicity of axially extending fingers 65 which cooperate to form a variable diameter portion 60', compare FIGS. 1 and 2, of the cylindrical surface. The fingers extend axially outward from the fixed diameter portion 60".

Each of the fingers 65 is provided at its axially outer end with a notch 65a, the plurality of notches cooperating to form a circumferential groove for locating an inextensible wire ring about which a ply ending of the air spring is to be wrapped.

The fingers 65 are movable angularly, FIG. 2, of the shaft so as to position the groove formed by the notches 65a at a diameter materially greater than the diameter of the fixed diameter portion 60" of the surface. Each of the fingers is provided at its axially inner end with an arcuate segment 65b of a torus, the surface of which is pivotably secured by the toric surface of a coaxial annular cavity 67 formed in the cavity ring 34c. As will be observed in FIG. 2, the fingers form a conic surface which provides a stable support for consolidating the ply materials of which the air spring is fabricated.

To effect the outward movement of the fingers, an inflatable sleeve 71 having two circular edges is secured to the annular body 34 radially inwardly of the fingers between an edge lock ring 73 and an air inlet spacer 75 having annular grooves 75a,75b receiving the edges. Compressed air for inflating the sleeve 75 is conducted through a passage 75c in the spacer which continues in the body 34 to connect with a fitting 77 which is connected by flexible tubing (not shown) to a fitting 79 which is in turn connected to the passage 23 in the shaft.

To fold the edges of the ply or plies of the air spring around an inextensible ring at the end of the air spring, a second sleeve 81 having circular edges is secured to the body 34, one edge 81a occupying a groove in the edge lock ring 73 located between the edge 75b and the axially inner ends 65b of the fingers and radially inward of the fingers. From this edge 81a the second sleeve extends axially outwardly beneath or radially inward of the fingers to a bight 81b and thence again axially inward to the other circular edge 81c which is secured against the air inlet ring 83 by a clamp sleeve 85 mounted on the body 34 and secured thereto by the shaft collar 34b which, being clamped against the body, secures the edges of each of the sleeves 71,81 to the body. To inflate the second sleeve 81, a passage 83a in the ring 83 communicates with a passage 87 in the body and a fitting 89 which is connected by a flexible tubing (not shown) to a fitting 91 in communication with the passage 21 in the shaft 12. Upon being inflated, the outer sleeve 81 is expanded (FIG. 2) to a diameter greater than the diameter of the fingers 65 and of the inextensible ring located by the notches 65a to an extent that the bladder 81 can be rolled manually or otherwise over the ring to form an end of the air spring.

A garter 94 surrounding the fingers 65 serves to retract them into the axially inward position as seen in FIG. 1, as the sleeves 71 and 81 are deflated.

The mandrel 100, FIG. 3 differs from the mandrel 10 described in connection with FIG. 1 in that the first annular body 30 has been replaced by an assembly identical to that described in connection with FIG. 1, namely, the second annular body 34 and the variable diameter portion 60' of the cylindrical surface 60 provided by the movable fingers 65. Thus, the mandrel 100 of FIG. 2 provides a cylindrical surface having a fixed diameter portion 60" intermediate a pair of variable diameter portions 60'.

The mandrel 100, in its fixed diameter portion 60", provides a cylindrical surface adjustable in axial length by a plurality of shells 103 each having a male 103' and a female end 103"; the male end being provided by a diameter reduced with respect to the surface 60 and extending axially outward from an end face, and the female end being provided by a cylindrical recess of a diameter adapted to receive the male end such that each pair of cylindrical shells interfit to provide a continuous cylindrical wall. The axial lengths of the several shells are selected such that the several combinations of two or more shells will provide desired lengths of the cylindrical surface 60. Individual elements in the mandrel 100 of FIG. 3 have been given numerals identical to those used to identify like elements of the mandrel 10 of FIG. 1 but with the prefix numeral 1. Thus, the shaft 12 of FIG. 1 corresponds as described with the shaft 112 of FIG. 3. Further description with respect to the mandrel of FIG. 3 is deemed not to be required.

While certain representative embodiments and details have been shown for the purpose of illustrating the invention, it will be apparent to those skilled in the art that various changes and modifications may be made therein without departing from the spirit or scope of the invention.

What is claimed is:

1. Apparatus for fabricating an air spring prior to its being shaped and cured, the air spring having an inextensible ring enfolded coaxially thereof in each of its axial ends, the apparatus comprising means defining a straight cylindrical surface axially coextensive with said air spring between said axial ends, said means including a fixed diameter portion and a variable diameter portion, the variable diameter portion comprising a multiplicity of axially extending fingers each having one end fixed radially adjacent one end of the fixed diameter portion and another end movable radially outward relative to its fixed end, each said other end having a notch, the plurality of notches cooperating to form a circumferential groove coaxially about said cylindrical surface and open radially outwardly thereof, a rigid body coaxially supporting said means, an inflatable sleeve having two circular edges secured to said rigid body axially between the inward end and the outward end of and radially inward of said fingers and passage means disposed in said rigid body for connecting said sleeve with compressed air whereby said members are moved arcuately outwardly in response to inflation of said sleeve, and a further inflatable sleeve having its two circular edges secured coaxially to said rigid body one edge thereof being secured radially inward of said members and axially between the inner end thereof and the axially inner edge of the first-mentioned bladder, the outer of said edges being secured axially outward of the first-mentioned bladder, and the sleeve extending axially outward from its one edge to a circumferential bight and thence axially inward to the other of its edges, and said passage means separately connecting the latter said sleeve with compressed air whereby the latter said sleeve is expanded in response to said air radially outwardly of the outer ends of said fingers while the same are in their radially expanded position.

2. Apparatus as claimed in claim 1, said straight cylindrical surface being adjustable in axial length and comprising two cylindrical members disposed coaxially of said shaft, one of said members being slidable telescopically into the other of said members.

3. Apparatus as claimed in claim 1, said straight cylindrical surface being adjustable in axial length, said surface defining means comprising a plurality of coaxial annular shells each having a male end and a female end each end being adapted to interfit another of said shells.

4. Apparatus as claimed in claim 1, said surface means including two variable diameter portions, one said variable diameter portion disposed respectively at each axial end of said fixed diameter portion.

5. Apparatus as claimed in claim 1, each said one end of said fingers having an arcuate segment of a torus and said rigid body having a coaxial toric cavity accommodating in circular array the toric surface of said segment of each of said fingers whereby the respective one ends of said members are fixed radially of the body.

6. Apparatus as claimed in claim 5, wherein said fingers comprise rigid bars extending between the respective inner and outer ends thereof.

7. Apparatus as claimed in claim 1, said fixed diameter portion terminating at one of its ends in a radially extending shoulder, and an inflatable bladder disposed coaxially of said cylindrical surface adjacent said shoulder and operable upon inflation thereof to fold sheet material about an inextensible ring disposed coaxially adjacent said shoulder and radially inward of said cylindrical surface.

8. An apparatus for fabricating an air spring comprising a shaft having a rotation axis, a member having a straight cylindrical surface extending along and around the shaft, a rigid annular body mounted coaxially on said shaft and supporting said member at one end thereof, a multiplicity of axially extending fingers having outer surfaces cooperable to form an axial extension of the cylindrical surface, the fingers each having at one axial end an arcuate segment of a torus, said body having a coaxial toric cavity accommodating in continuous circular array the toric segments of said fingers for arcuate movement of the fingers to define a conic surface coaxial with and extending angularly outward from the cylindrical surface, the fingers each having at the other axial end thereof a notch, which notches cooperate to form a circumferential groove to position an endless inextensible ring, an inflatable sleeve having two circular edges secured coaxially to said rigid body, one of said edges disposed radially inwardly of said fingers and axially between the ends thereof, the other of said edges disposed axially outward of said one edge, the sleeve extending axially outward from the one edge to a circumferential bight and thence axially inward to the other edge, a second inflatable sleeve having two circular edges secured to said rigid body, one of the latter said edges close to the one edge of the first mentioned sleeve, the other of the latter said edges spaced axially outward thereof, the second sleeve extending straightly between its edges radially inward of and contiguous to the first sleeve, said rigid body having passage means therein for separately connecting each said sleeve with compressed air whereby said members are moved arcuately outward and the first mentioned sleeve expanded radially outwardly of the outer ends of said members.

* * * * *